(No Model.)
C. E. TOMLINSON.
WHEEL.
No. 560,660. Patented May 26, 1896.
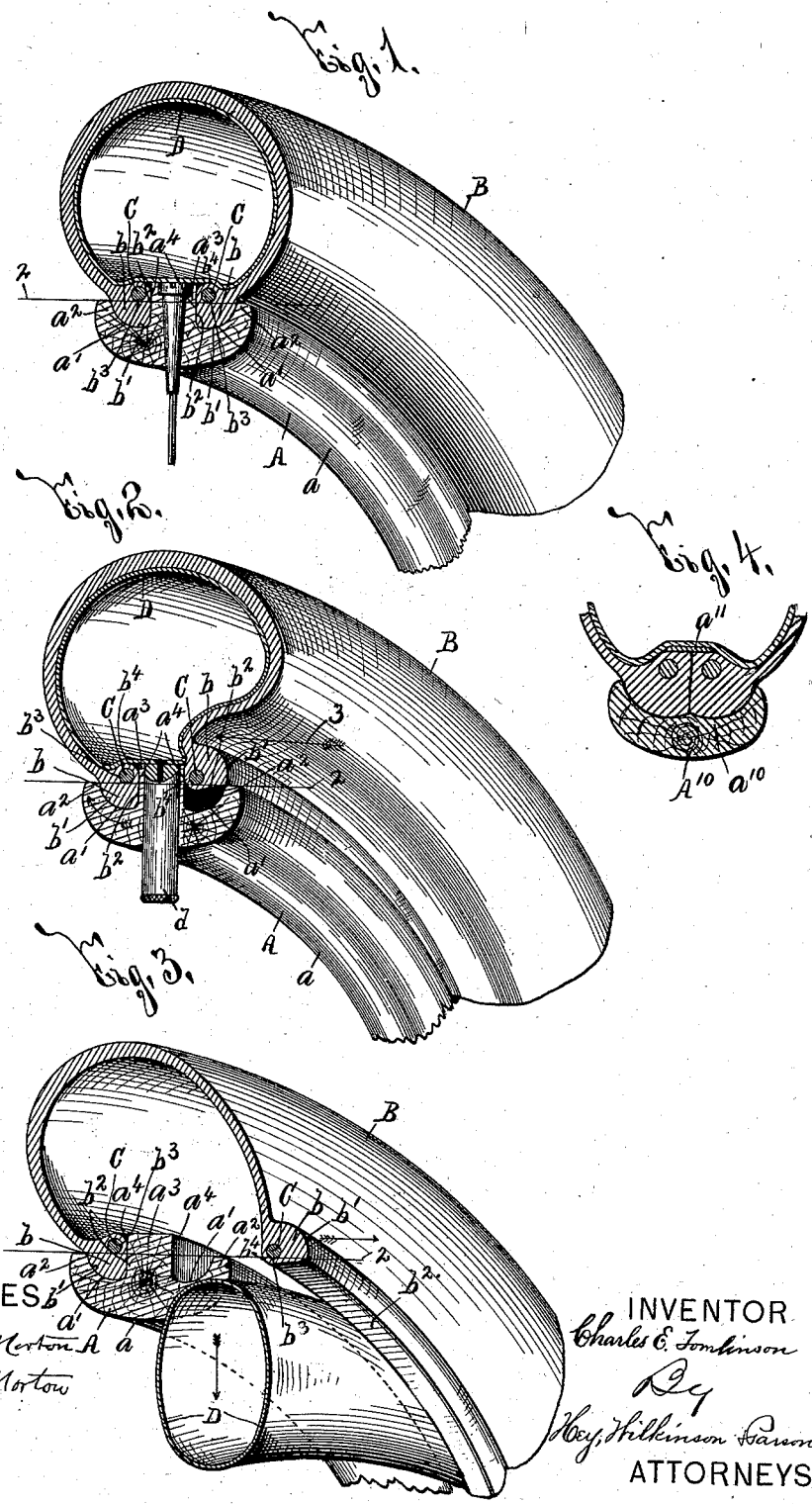
WITNESSES
Clark H. Norton
Warren S. Norton
INVENTOR
Charles E. Tomlinson
By
Hey, Wilkinson & Parsons
ATTORNEYS.

UNITED STATES PATENT OFFICE.

CHARLES E. TOMLINSON, OF SYRACUSE, NEW YORK.

WHEEL.

SPECIFICATION forming part of Letters Patent No. 560,660, dated May 26, 1896.

Application filed September 14, 1894. Serial No. 522,986. (No model.)

*To all whom it may concern:*

Be it known that I, CHARLES E. TOMLINSON, of Syracuse, in the county of Onondaga, in the State of New York, have invented new and useful Improvements in Wheels, of which the following, taken in connection with the accompanying drawings, is a full, clear, and exact description.

My invention relates to improvements in vehicle-wheels, and has for its object the production of a simple, practical, and effective device for securing a tire to the wheel-rim, permitting easy removal of the tire and enabling the use of the wheel when the tire is deflated; and to this end it consists, essentially, in a rim having its outer edge provided with a groove formed with an engaging shoulder at its outer side, a tire provided with a thickened edge arranged in the groove in proximity to said shoulder, and a substantially non-extensible strip secured to said thickened tire edge for fastening the same to the rim and disposed in a curved plane separated from the inner face of the tire edge and the adjacent face of the engaging shoulder and arranged eccentric to the thickened tire edge, whereby the tire edge swings outwardly on said strip from its normal position.

The invention furthermore consists in the detail construction and arrangement of the parts, all as hereinafter more particularly described, and pointed out in the claims.

In describing this invention reference is had to the accompanying drawings, forming a part of this specification, in which like letters indicate corresponding parts in all the views.

Figure 1 is an isometric view of a transverse section of a wheel-rim and a tire constructed in accordance with my invention, the parts being shown in their normal position. Fig. 2 is a similar view illustrating one of the edges of the tire as partly removed from operative position. Fig. 3 is also a similar view showing the edge of a tire as entirely removed and the inflatable tube as partly withdrawn from the interior of the tire, and Fig. 4 is a transverse sectional view of a rim and the adjacent thickened edges of a tire embodying a slightly-modified construction of my invention.

A represents the rim; B, the tire; C, the fastening-strip, and D an inflatable tube within the tire.

The rim A is illustrated as composed of wood, but may be formed of sheet or rolled metal or other suitable material, if desired. Its inner face $a$ is preferably formed convex and its outer face is provided with an annular groove or grooves $a'$. In Figs. 1, 2, and 3 the rims are shown as provided with separated grooves and an interposed rib, and at Fig. 4 as provided with a single groove. The grooves $a'\ a'$ of the preferable construction of rim are formed with substantially concave bearing faces and shoulders $a^2$ at their outer edges having concave inner faces. The rib $a^3$, interposed between the grooves $a'\ a'$, is provided with substantially flat opposite faces $a^4\ a^4$ and forms the inner shoulders of the grooves $a'\ a'$. Said rib $a^3$ is preferably formed of greater height or projection than the shoulders $a^2\ a^2$, and the outer edges of its faces $a^4\ a^4$ are thus of greater diameter than the outer edges of the shoulders $a^2\ a^2$.

The tire B is preferably crescent-shaped and formed with thickened edges $b\ b$, arranged normally in the grooves $a'\ a'$ in the rim, and provided with convex inner faces $b'$, adapted to engage the adjacent faces of the grooves $a'\ a'$ and the shoulders $a^2$. The adjacent faces $b^2$ of the tire edges $b\ b$ are formed substantially flat, and preferably engage the faces $a^4$ of the rib $a^3$. The thickened tire edges $b\ b$ are formed with annular eyes $b^3$, which are arranged eccentric to said tire edges in proximity to the point of union of their faces $b^2$ and the outer faces $b^4$ of said edges and separated from the inner faces of said edges. The eyes $b^3$, as clearly seen at Figs. 1, 2, and 3, are preferably arranged substantially coincident with the annular planes, around which the planes of the tire-faces $b'$ are described. Consequently the eyes $b^3$ are arranged at the outside of the annular plane coincident with the outer edges of the shoulders $a^2$, as indicated by the lines 2, Figs. 1, 2, and 3, and are of greater diameter than said shoulders.

The annular strips C C for securing the tire to the rim are arranged within the eyes

$b^3$, and consist, preferably, of a wire, a cord, or other suitable device. The strips C are non-extensible longitudinally, and are preferably formed circular, but may obviously consist of segments suitably connected. The thickened edges of the tire are free to swing outwardly or inwardly upon the strips or bands C, which are preferably loosely mounted in the eyes $b^3$. The removal and securement of the tire edges are thus easily effected and the tire is firmly held in its operative position. I have here illustrated both edges of the tire as secured by a fastening strip or band C; but it is obvious that one edge thereof may be fastened by any suitable means, as cement, well known to those skilled in the art, and its other edge provided with a fastening strip or band, as illustrated and described.

The inflatable tube D, which I preferably use within the tire B, is of any desirable form, size, and construction, and is provided with a suitable inlet $d$. It is evident, however, that the inflatable tube D may be dispensed with. When an inflatable tube D is used, the outer face of the rib $a^3$ forms a practical support for the adjacent portion thereof and prevents entrance of the sack between the tire edges.

When it is desired to remove a portion of the tire, the same is pressed inwardly, as indicated by arrow 3, directly at the outside of the adjacent portion of one of the strips or bands D, and the tire edge then swings outwardly upon the band or strip as a pivot, as clearly seen at Fig. 2. The tire edge is then engaged by the operator and, together with its band, is withdrawn from the portion of the groove in which it is normally arranged. The tube D may then be readily removed, as shown at Fig. 3, for examination or repair, and when returned to its operative position the tire edge may be forced within the portion of the groove of the rim for receiving the same.

At Fig. 4 I have shown a rim $A^{10}$ as formed with a single groove $a^{10}$, and with this construction of rim the tire edges are formed of sufficient thickness to permit engagement of their adjacent faces, and the inflatable tube is preferably provided with a protecting-strip $a^{11}$.

The operation of my invention will be readily understood upon reference to the foregoing drawings and the accompanying description, and it will be evident that the tire is firmly held in position, even though the tire is deflated, and is easily removed.

It will be particularly understood that my invention is not limited to a rim provided with two grooves, as but one may be used, if desired, as clearly seen at Fig. 4.

Having thus fully described my invention, what I claim as new, and desire to secure by Letters Patent, is—

1. The combination of a wheel-rim having its outer edge provided with a groove formed with an engaging shoulder at its outer side, a tire provided with a thickened edge arranged in the groove in proximity to said shoulder, and a substantially non-extensible strip secured to said thickened tire edge and disposed in a curved plane separated from the inner face of the tire edge and the adjacent face of said engaging shoulder, and arranged eccentric to the thickened tire edge whereby the tire edge swings outwardly on said strip from its normal position, substantially as described.

2. The combination of a wheel-rim having its outer edge provided with a groove formed with an engaging shoulder at its outer side, a tire provided with a thickened edge arranged in the groove in proximity to said shoulder, and a substantially non-extensible band loosely secured to said thickened tire edge and disposed in a curved plane separated from the inner face of the tire edge and the adjacent face of said shoulder, and arranged eccentric to the thickened tire edge whereby the tire edge swings outwardly on said band from its normal position, substantially as specified.

3. The combination of a wheel-rim having its outer edge provided with a groove formed with an engaging shoulder at its outer side, a tire provided with a thickened edge arranged in the groove in proximity to said shoulder and formed with an annular eye separated from the inner face of the tire edge and the adjacent face of the engaging shoulder said eye being arranged eccentric to the thickened tire edge and having its outer face of greater diameter than the outer edge of said shoulder, and a substantially non-extensible strip arranged in said eye, whereby the tire edge swings on said strip from its normal position, substantially as set forth.

4. The combination of a wheel-rim having its outer edge provided with a groove formed with an annular concave bearing-face and an engaging shoulder at its outer edge, a tire provided with a thickened edge formed with an annular convex face bearing against the concave face and the adjacent face of said shoulder, and a substantially non-extensible strip secured to the tire edge and disposed in a curved plane arranged eccentric to the thickened tire edge and substantially coincident with the annular plane around which the plane of the convex face of the tire edge is described, substantially as described.

5. The combination of a wheel-rim having its outer edge provided with a groove formed with an annular concave bearing-face and an engaging shoulder at its outer side, a tire provided with a thickened edge formed with an annular convex inner face bearing against said concave face and the adjacent face of said shoulder, and a substantially flat face extending from the inner side of the convex face, and a substantially non-extensible strip loosely secured to the thickened tire edge and disposed in a curved plane separated from the inner face of the tire edge and the adjacent face of the engaging shoulder and arranged eccentric to the thickened tire edge whereby the tire edge swings outwardly on said strip from its normal position, substantially as specified.

6. The combination of a wheel-rim having its outer edge provided with a groove formed with an annular concave bearing-face and an engaging shoulder at its outer side, a tire provided with a thickened edge formed with an annular convex face bearing against the concave face and the adjacent face of said shoulder and with an annular eye separated from the engaging shoulder and having its outer edge of greater diameter than the outer face of said shoulder, said eye being arranged eccentric to the thickened tire edge and a substantially non-extensible band loosely mounted in said eye whereby the tire edge swings on said band from its normal position, substantially as and for the purpose described.

7. The combination of a wheel-rim having its outer edge provided with a groove formed with an annular concave bearing-face, an engaging shoulder at its outer side having an annular concave inner face, and a substantially flat shoulder at the inner side thereof, a tire provided with a thickened edge formed with an annular convex inner face bearing against said bearing-face and engaging shoulder, and an annular substantially flat face at the inner side of the convex face bearing against said flat shoulder, and a substantially non-extensible strip secured to said tire edge and disposed in a curved plane separated from the inner face of the tire edge and the adjacent face of the outer shoulder, and arranged eccentric to the thickened tire edge whereby the tire edge swings on said strip from its normal position, substantially as specified.

8. The combination of a wheel-rim having its outer edge provided with a groove formed with an annular concave bearing-face, an engaging shoulder at its outer side having an annular concave inner face, and a substantially flat shoulder at the inner side thereof having its outer edge of greater diameter than the outer edge of the engaging shoulder, a tire provided with a thickened edge formed with an annular substantially convex engaging face bearing against the inner shoulder, and an annular substantially flat face at the inner side of the convex face bearing against the former flat shoulder, and a substantially non-extensible band loosely secured to the tire edge and arranged eccentric to the thickened tire edge and substantially coincident with the annular plane around which the plane of the curved face of the tire edge is described, substantially as described.

9. The combination of a wheel-rim having its outer edge provided with a groove formed with an annular shoulder at its outer side having a concave inner face, and a substantially flat annular shoulder at the inner side thereof having its outer edge of greater diameter than the outer edge of the inner shoulder, a tire provided with a thickened edge formed with a substantially convex inner face bearing against the engaging shoulder, a substantially flat face at the inner side of the convex face bearing against the former flat shoulder, said thickened tire edge being also provided with an eccentric annular eye arranged in proximity to the point of union of the flat and outer edges of said tire edge, and a band loosely mounted in said eye, whereby the tire edge swings on said band from its normal position, substantially as specified.

10. The combination with a wheel-rim provided with a projecting rib and grooves on opposite sides of said rib formed with convex bearing-faces and provided with engaging shoulders at their outer sides; of a tire provided with thickened edges mounted in said grooves and bearing against the adjacent faces of said rib and shoulders, strips secured eccentrically to said tire edges in proximity to the outer edges of the adjacent faces of the rib, and an inflatable sack within the tire, substantially as described.

In testimony whereof I have hereunto signed my name, in the presence of two attesting witnesses, at Syracuse, in the county of Onondaga, in the State of New York, this 27th day of August, 1894.

CHARLES E. TOMLINSON.

Witnesses:
E. A. WEISBURG,
K. H. THEOBALD.